United States Patent
Tao et al.

(10) Patent No.: US 8,364,364 B1
(45) Date of Patent: Jan. 29, 2013

(54) SYSTEM AND METHOD FOR CONTROLLING UNPOWERED TO POWERED TRANSITIONS IN VEHICLES HAVING DRY DUAL CLUTCH TRANSMISSIONS

(75) Inventors: Xuefeng Tim Tao, Northville, MI (US); John William Boughner, Howell, MI (US); Ronald F. Lochocki, Jr., Ypsilanti, MI (US); Jonathan P. Kish, Royal Oak, MI (US); Jayson S. Schwalm, Farmington Hills, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/230,256

(22) Filed: Sep. 12, 2011

(51) Int. Cl.
*G06F 19/00* (2011.01)
(52) U.S. Cl. ............... 701/68; 701/51; 74/329; 74/330; 74/331; 74/335; 74/340; 137/118.02; 137/597; 137/625.69; 244/169; 244/171.3; 244/171.5; 180/65.6; 180/65.22; 477/3; 477/5
(58) Field of Classification Search ............... 701/51; 74/329, 330, 331, 335, 340, 660, 661; 137/118.02, 137/597, 625.69; 244/169, 171.3, 175.5, 244/185.5; 180/65.6, 65.22; 477/3, 5; 903/946; 251/282; 475/205
See application file for complete search history.

(56) References Cited

U.S. PATENT DOCUMENTS

| | | | | |
|---|---|---|---|---|
| 5,213,178 A | * | 5/1993 | Polidan et al. | 180/197 |
| 5,519,617 A | * | 5/1996 | Hughes et al. | 701/84 |
| 5,642,626 A | * | 7/1997 | Uno et al. | 62/127 |
| 6,591,705 B1 | * | 7/2003 | Reik et al. | 74/343 |
| 6,951,526 B2 | * | 10/2005 | Kuhstrebe et al. | 477/97 |
| 7,107,870 B2 | * | 9/2006 | Kuhstrebe et al. | 74/336 R |
| 7,207,922 B2 | * | 4/2007 | Kuhstrebe et al. | 477/97 |
| 7,287,443 B2 | * | 10/2007 | Kuhstrebe et al. | 74/335 |
| 7,757,666 B2 | * | 7/2010 | Whitney et al. | 123/481 |
| 8,062,171 B2 | * | 11/2011 | Soliman | 477/3 |
| 8,157,035 B2 | * | 4/2012 | Whitney et al. | 180/65.265 |
| 8,190,343 B2 | * | 5/2012 | Chen et al. | 701/67 |

OTHER PUBLICATIONS

U.S. Appl. No. 13/011,147, filed Jan. 21, 2011, Joathan P. Kish.

* cited by examiner

*Primary Examiner* — James P Trammell
*Assistant Examiner* — McDieunel Marc

(57) ABSTRACT

A control system for a vehicle having a dry dual clutch transmission (DCT) includes a launch condition detection module, a vehicle stop module, and a vehicle launch module. The launch condition detection module detects a launch condition based on whether (i) the vehicle is on an uphill grade and (ii) a driver of the vehicle has requested power via an accelerator. The vehicle stop module stops the vehicle when the launch condition is detected by (i) commanding an on-coming clutch of the dry DCT to a predetermined position and (ii) applying brakes of the vehicle. The vehicle launch module launches the vehicle after the vehicle is stopped by (i) fully engaging the on-coming clutch of the dry DCT and (ii) opening a throttle to a desired position corresponding to the power request.

20 Claims, 6 Drawing Sheets

SYSTEM AND METHOD FOR CONTROLLING UNPOWERED TO POWERED TRANSITIONS IN VEHICLES HAVING DRY DUAL CLUTCH TRANSMISSIONS

FIELD

The present disclosure relates to vehicle control systems, and more particularly to a system and method for controlling unpowered to powered transitions in vehicles having dry dual clutch transmissions (DCTs).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (NF) mixture within cylinders to drive pistons that rotatably turn a crankshaft and generate drive torque. The drive torque is transferred from the crankshaft to a driveline of a vehicle via a transmission. A dual clutch transmission (DCT) includes two clutches. Each of the clutches selectively engages gears to provide a plurality of different gear ratios. The two clutches may each be "dry" clutches that directly couple the DCT to the crankshaft (also known as a "dry DCT"). For example, one dry DCT clutch may control odd numbered gears and another dry DCT clutch may control even numbered gears. Dry DCTs may provide for increased fuel economy and/or improved shift responsiveness compared to other transmissions.

SUMMARY

A control system for a vehicle having a dry dual clutch transmission (DCT) includes a launch condition detection module, a vehicle stop module, and a vehicle launch module. The launch condition detection module detects a launch condition based on whether (i) the vehicle is on an uphill grade and (ii) a driver of the vehicle has requested power via an accelerator. The vehicle stop module stops the vehicle when the launch condition is detected by (i) commanding an on-coming clutch of the dry DCT to a predetermined position and (ii) applying brakes of the vehicle. The vehicle launch module launches the vehicle after the vehicle is stopped by (i) fully engaging the on-coming clutch of the dry DCT and (ii) opening a throttle to a desired position corresponding to the power request.

A method for controlling a vehicle having a dry dual clutch transmission (DCT) includes detecting a launch condition based on whether (i) the vehicle is on an uphill grade and (ii) a driver of the vehicle has requested power via an accelerator, stopping the vehicle when the launch condition is detected by (i) commanding an on-coming clutch of the dry DCT to a predetermined position and (ii) applying brakes of the vehicle, and launching the vehicle after the vehicle is stopped by (i) fully engaging the on-coming clutch of the dry DCT and (ii) opening a throttle to a desired position corresponding to the power request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
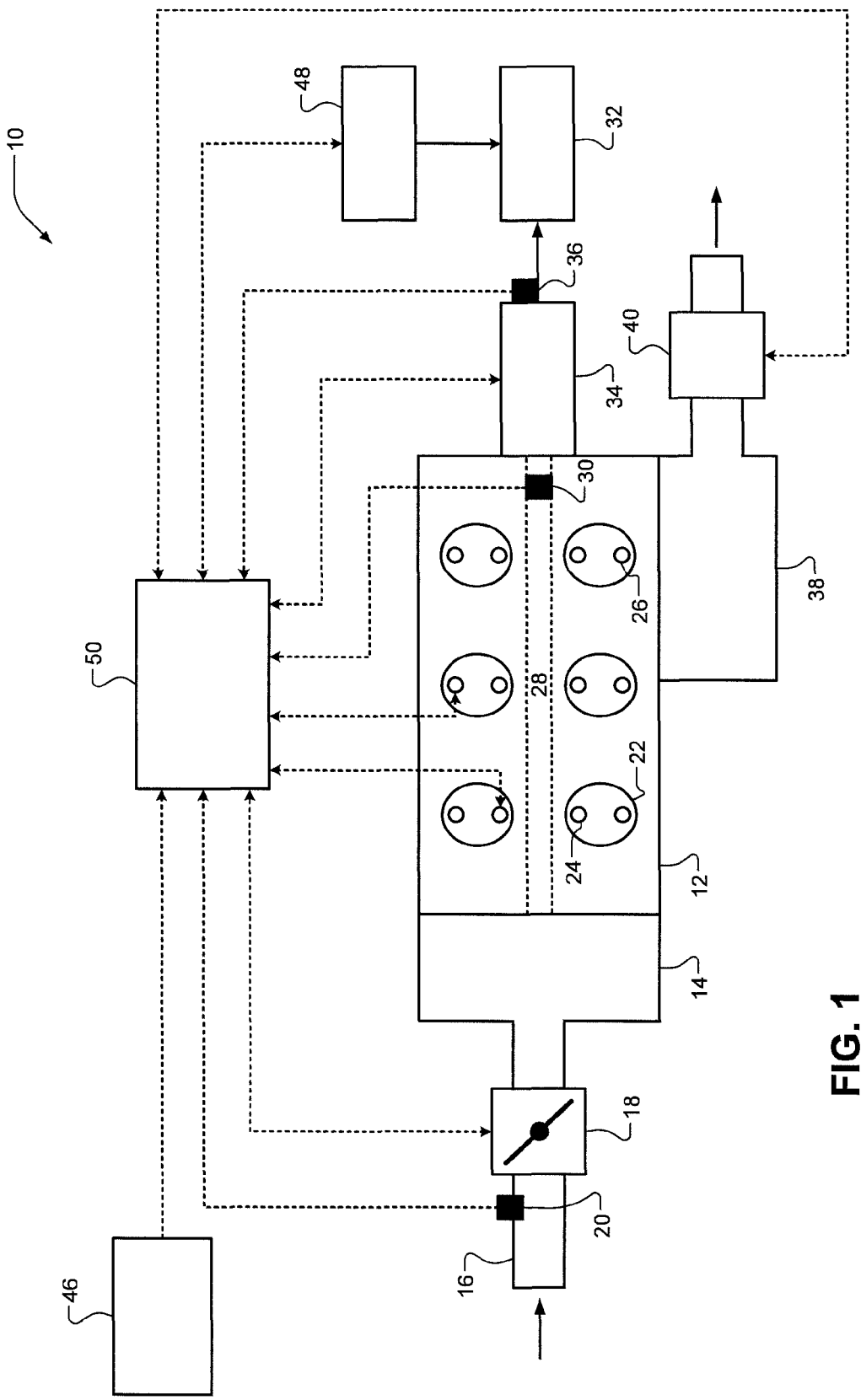
FIG. 1 is a functional block diagram of an example vehicle according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle may transition from an unpowered state to a powered state in response to driver input via an accelerator. The transition from the unpowered state to the powered state may also be referred to as a "launch" of the vehicle. Specifically, the unpowered state includes periods when a transmission is not transferring torque from a crankshaft of an engine to a driveline of the vehicle. The powered state, on the other hand, includes periods when the transmission is transferring torque from the engine crankshaft to the vehicle driveline. Transmissions may be coupled to the engine crankshaft by a fluid coupling such as a torque converter.

A dry dual clutch transmission (DCT), however, is not coupled to the engine crankshaft via a torque converter. Therefore, a dry DCT may launch the vehicle by partially engaging one of the two clutches corresponding to an on-coming gear ("the on-coming clutch"). The friction generated by partially engaging the on-coming clutch rotates the vehicle driveline thereby propelling the vehicle. In some situations, the launch of the vehicle via the dry DCT may generate significant heat due to friction on the on-coming clutch. For example, when the vehicle is on an uphill/inclined grade (and therefore rolling backwards), a launch of the vehicle may generate heat that may damage the dry DCT.

Accordingly, a system and a method for controlling unpowered to powered transitions in vehicles having dry DCTs are presented. The system and method may first detect whether a launch condition of the vehicle is present. The launch condition may indicate that the vehicle is on an uphill (i.e., inclined) grade and a driver of the vehicle is requesting power via an accelerator. Additionally, in some implementations the system and method may detect the launch condition further based on whether brakes of the vehicle are fully applied. More specifically, the launch condition may further indicate that the brakes are not fully applied. When the launch condition is detected, the system and method may stop the vehicle.

The system and method may stop the vehicle by (i) commanding an on-coming clutch of the dry DCT to a predetermined position and (ii) applying the brakes of the vehicle. The predetermined position may be a kiss point. For example, the system and method may command the on-coming clutch from a pre-kiss point to the kiss point. The system and method may apply the brakes of the vehicle to slow the vehicle to a predetermined speed. For example, the predetermined speed may be zero miles per hour (mph). When the vehicle has stopped, the system and method may (i) fully engage the on-coming clutch to a desired gear and (ii) open a throttle of an engine powering the vehicle to a desired position corresponding to the driver's power request.

Referring now to FIG. 1, an example vehicle 10 includes an engine 12. The engine 12 may be a spark ignition (SI) engine, a diesel engine, a homogeneous charge compression ignition (HCCI) engine, or another suitable type of engine. The engine system 10 may also be a hybrid system and therefore may include additional components such as an electric motor and a battery system.

The engine 12 draws air into an intake manifold 14 through an induction system 16 that may be regulated by a throttle 18. For example, the throttle 18 may be electrically controlled via electronic throttle control (ETC). A mass air flow (MAF) sensor 20 measures MAF through the throttle 18. For example, the measured MAF may indicate a load on the engine 12. The air in the intake manifold 14 is distributed to a plurality of cylinders 22 and combined with fuel to create an air/fuel (NF) mixture. While six cylinders are shown, the engine 12 may have other numbers of cylinders.

Fuel injectors 24 may inject the fuel to create the NF mixture. For example, the fuel injectors 24 may inject the fuel into intake ports of the cylinders 22, respectively, or directly into the cylinders 22, respectively. The NE mixture is compressed by pistons (not shown) within the cylinders 22. Depending on the type of engine 12, spark plugs 26 may ignite the compressed NF mixture. Alternatively, the NF mixture may be compressed until auto-ignition occurs. The combustion of the NE mixture within the cylinders drives the pistons (not shown) which rotatably turn a crankshaft 28 and generate drive torque. An engine speed sensor 30 measures a rotational speed of the crankshaft 28 (e.g., in revolutions per minute, or RPM).

The drive torque at the crankshaft 28 is transferred to a driveline 32 of the vehicle 10 via a dry dual clutch transmission (DCT) 34. The dry DCT 34 includes a plurality of gear ratios for translating the drive torque at the crankshaft 28 to a desired drive torque at the driveline 32. The dry DCT 34 may also include two clutches for selectively shifting between the gear ratios. A transmission output shaft speed (TOSS) sensor 36 measures a rotational speed of an output shaft of the dry DCT 34. For example, the measured TOSS may indicate a speed of the vehicle 10.

Exhaust gas resulting from combustion is expelled from the cylinders 22 into an exhaust manifold 38. The exhaust gas in the exhaust manifold 38 may be treated by an exhaust treatment system 40 before being released into the atmosphere. For example, the exhaust treatment system 40 may include at least one of an oxidation catalyst (OC), nitrogen oxide (NOx) adsorbers/absorbers, a lean NOx trap (LNT), a selective catalytic reduction (SCR) system, a particulate matter (PM) filter, and a three-way catalytic converter. Brakes 48 may slow or stop rotation of the driveline 32.

A control module 50 controls operation of the vehicle 10. The control module 50 may receive signals from the throttle 18, the MAF sensor 20, the fuel injectors 24, the spark plugs 26, the engine speed sensor 30, the dry DCT 34, the TOSS sensor 38, the exhaust treatment system 40, the driver input 46, and/or the brakes 48. The control module 50 may control the throttle 18, the fuel injectors 24, the spark plugs 26, the dry DCT 34, the exhaust treatment system 40, and/or the brakes 48. While the control module 50 is shown to control the brakes 48, in some implementations the driver input 46 may directly control the brakes 48. Additionally, the control module 50 may also implement the system or method of the present disclosure.

Figure 2:
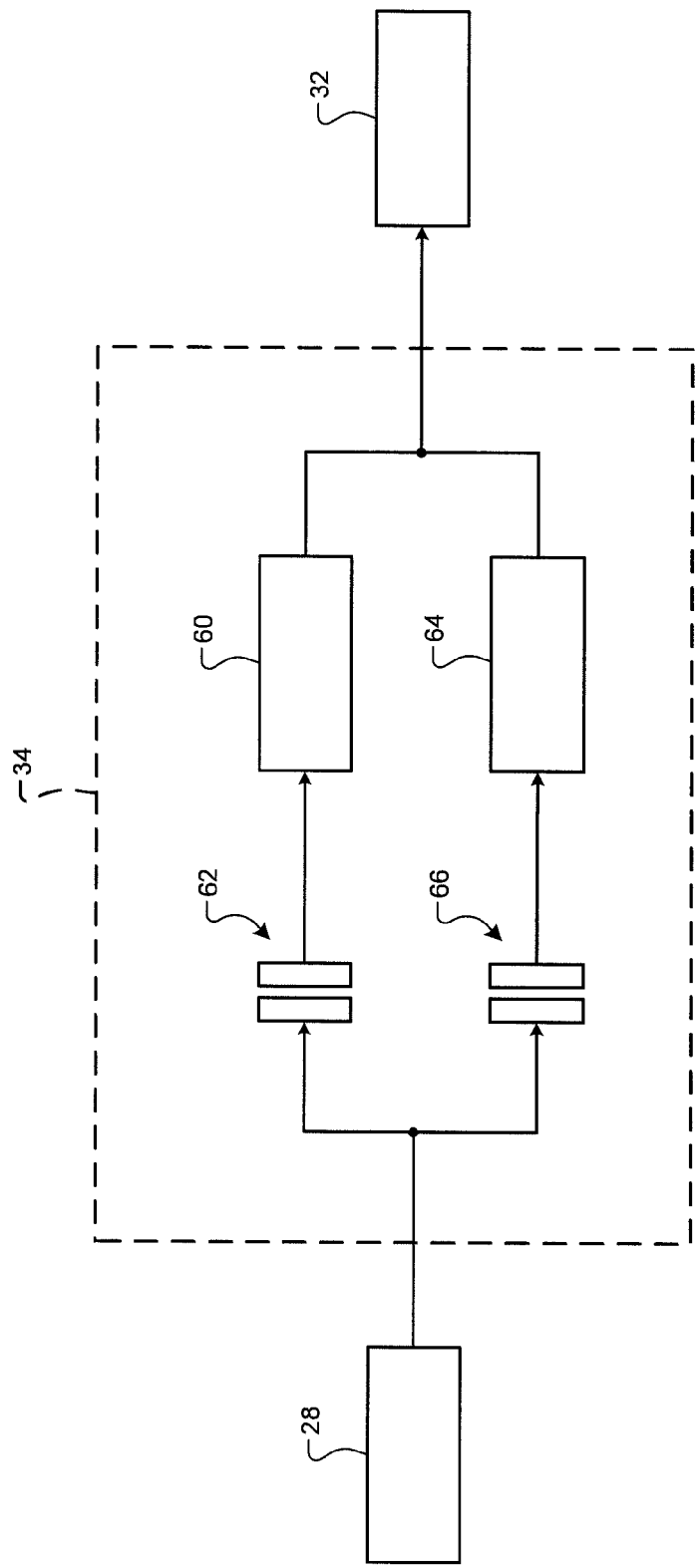
FIG. 2 is a schematic of an example dry dual clutch transmission (DCT) according to one implementation of the present disclosure.

Referring now to FIG. 2, an example of the dry DCT 34 is shown. The dry DCT 34 translates drive torque at the crankshaft 28 ($T_{IN}$) to a desired torque at the driveline 32 ($T_{OUT}$). Specifically, the dry DCT 34 includes a first clutch 60 that selectively engages one of a first set of gears 62 and a second clutch 64 that selectively engages one of a second set of gears 66. For example, the first set of gears 62 may include odd numbered gears (e.g., 1, 3, 5, 7, etc.) and the second set of gears 66 may include even numbered gears (e.g., 2, 4, 6, etc.). Additionally, for example, the second set of gears may include a reverse gear (R).

The dry DCT 34 launches the vehicle 10 via friction from a selected one of the first and second clutches 60 and 64, respectively. Shifting between gears of the dry DCT 34, on the other hand, includes engaging one of the first and second clutches 60 and 64, respectively ("the on-coming clutch") while disengaging the other of the first and second clutches 60 and 64, respectively ("the off-going clutch"). More specifically, shift forks hydraulically actuate synchronizers to engage a desired gear of the first and second sets of gears 62 and 66, respectively, associated with the on-coming clutch.

Figure 3:
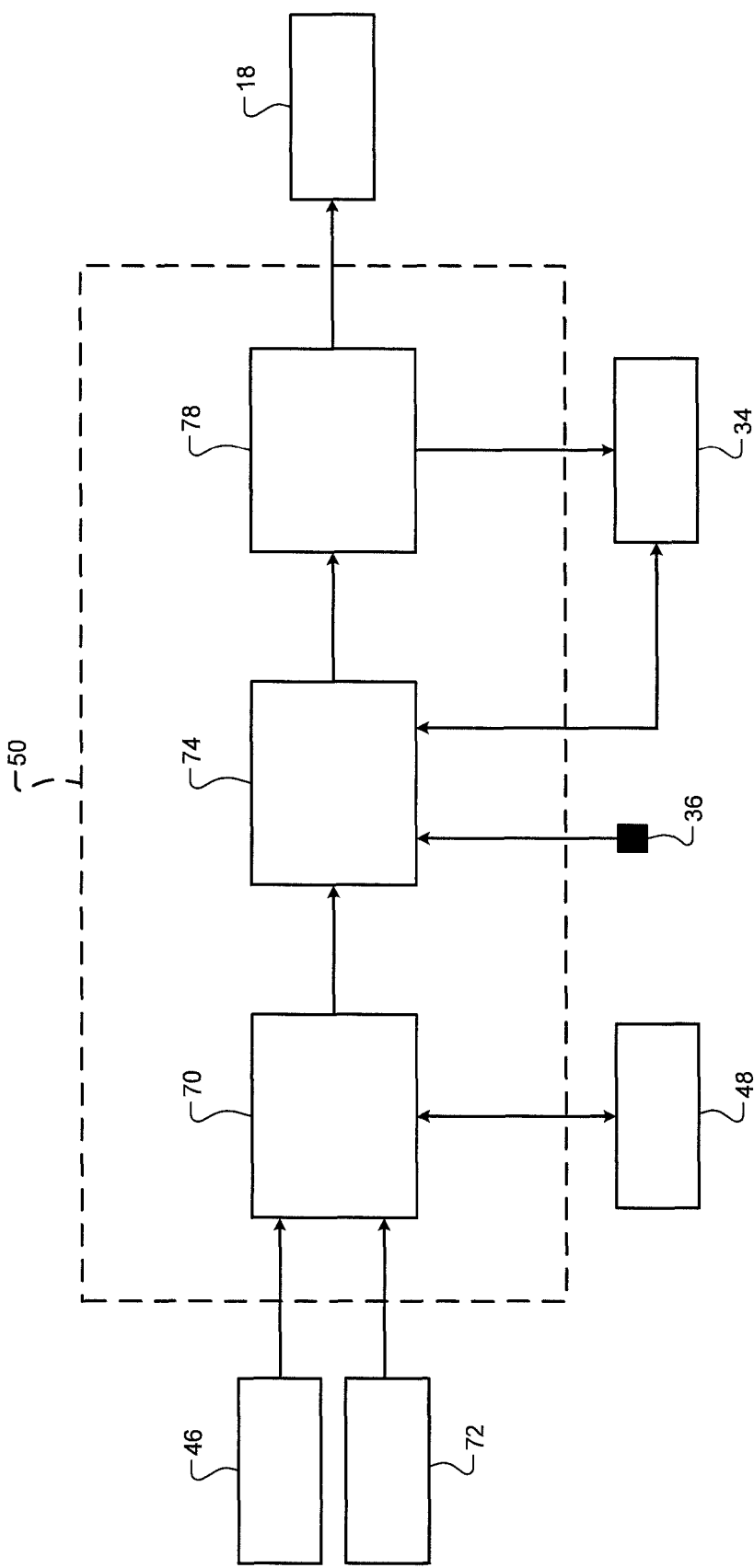
FIG. 3 is a functional block diagram of an example control module according to one implementation of the present disclosure.

Referring now to FIG. 3, an example of the control module 50 is shown. The control module 50 may include a launch condition detection module 70, a vehicle stop module 74, and a vehicle launch module 78.

The launch condition detection module 70 detects a launch condition for the vehicle 10. The launch condition indicates when (i) the vehicle 10 is on an uphill (i.e., inclined) grade and (ii) a driver is requesting power via an accelerator (e.g., driver input 46). For example, the launch condition detection module 70 may determine whether the vehicle 10 is on an uphill grade using an accelerometer 72. Additionally, the launch condition detection module 70 may detect the launch condition further based on whether the brakes 48 are applied. More specifically, the launch condition detection module 70 may detect the launch condition when the brakes 48 are not fully applied. For example, the brakes 48 may be partially applied by the driver or by a hill descent control (HDC) system. Additionally, for example, the launch condition detection module 70 may detect whether the brakes are not fully applied based on measurements from a brake pressure sensor (not shown). When the launch condition is detected, the launch condition detection module 70 may generate a signal to notify the vehicle stop module 74.

The vehicle stop module 74 may receive the signal from the launch condition detection module 70 indicating that the launch condition has been detected. When the launch condition has been detected and the driver of the vehicle 10 is requesting power (e.g., via an accelerator), the vehicle stop module 74 may stop the vehicle 10. Specifically, the vehicle stop module 74 may (i) command the on-coming clutch of the dry DCT 34 to a predetermined position and (ii) apply the brakes 48 of the vehicle 10. The predetermined position may represent a kiss point (KP) of the on-coming clutch. For example, the on-coming clutch may be transitioned from a pre-kiss point (PKP) to the KP. The vehicle stop module 74 may apply the brakes 48 to slow the vehicle 10 to a predetermined speed. For example, the predetermined speed may be zero miles per hour (mph).

The vehicle stop module 74 may apply the brakes 48 according to a cubic velocity path. More specifically, application of the brakes 48 according to the cubic velocity path may include a parabolic application of brake torque by the brakes 48. Alternatively, the vehicle stop module 74 may apply the brakes 48 according to a half-parabolic velocity path. More specifically, application of the brakes 48 according to the half-parabolic velocity path may include a linear application of brake torque by the brakes 48. The cubic velocity path may be smoother than the half-parabolic velocity path and may also be easier to implement. The half-parabolic velocity path, however, may stop the vehicle 10 faster.

Figure 4A:
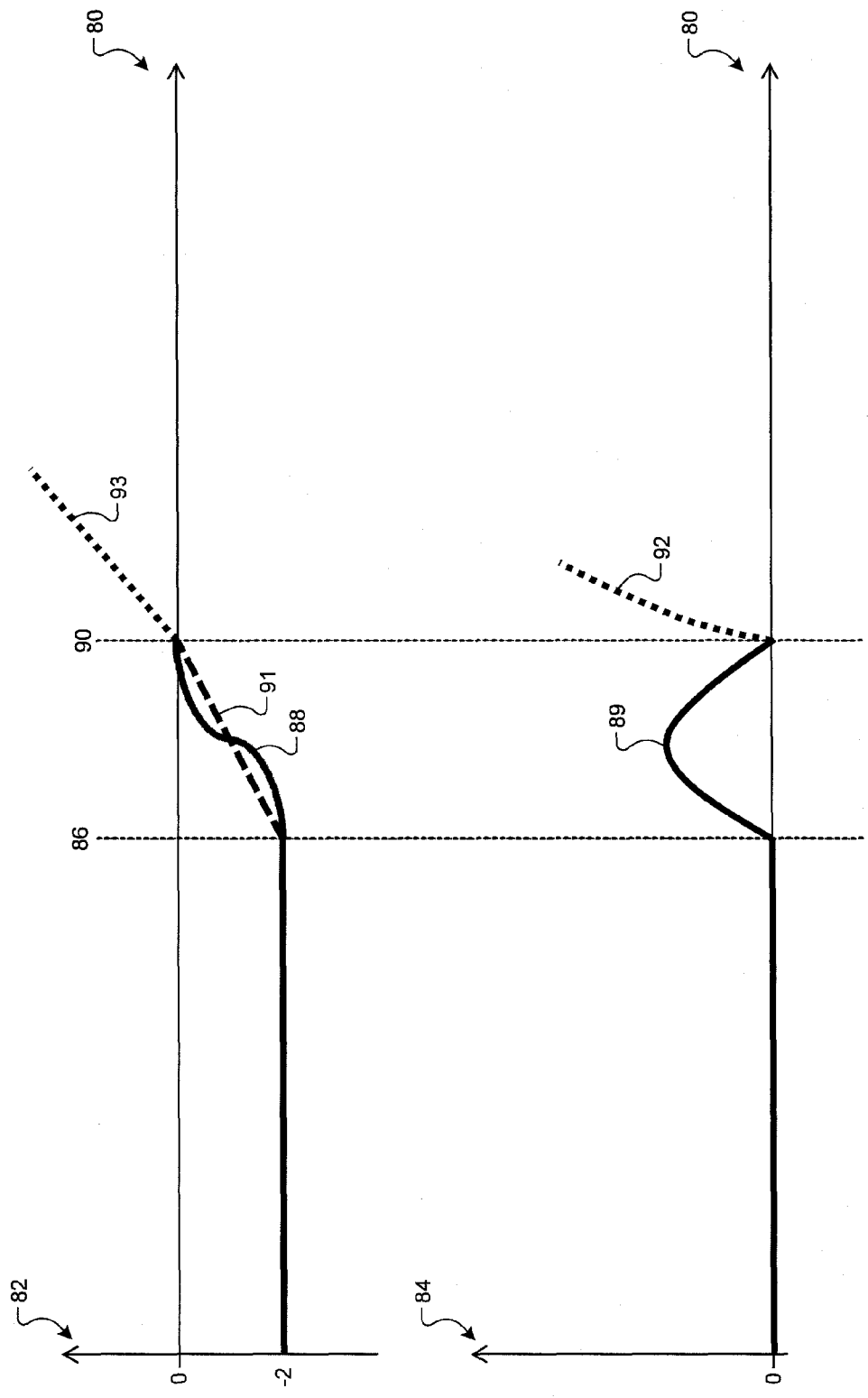
FIG. 4A is a graph illustrating a simulated unpowered to powered transition for a vehicle having a dry DCT according to one implementation of the present disclosure.
Figure 4B:
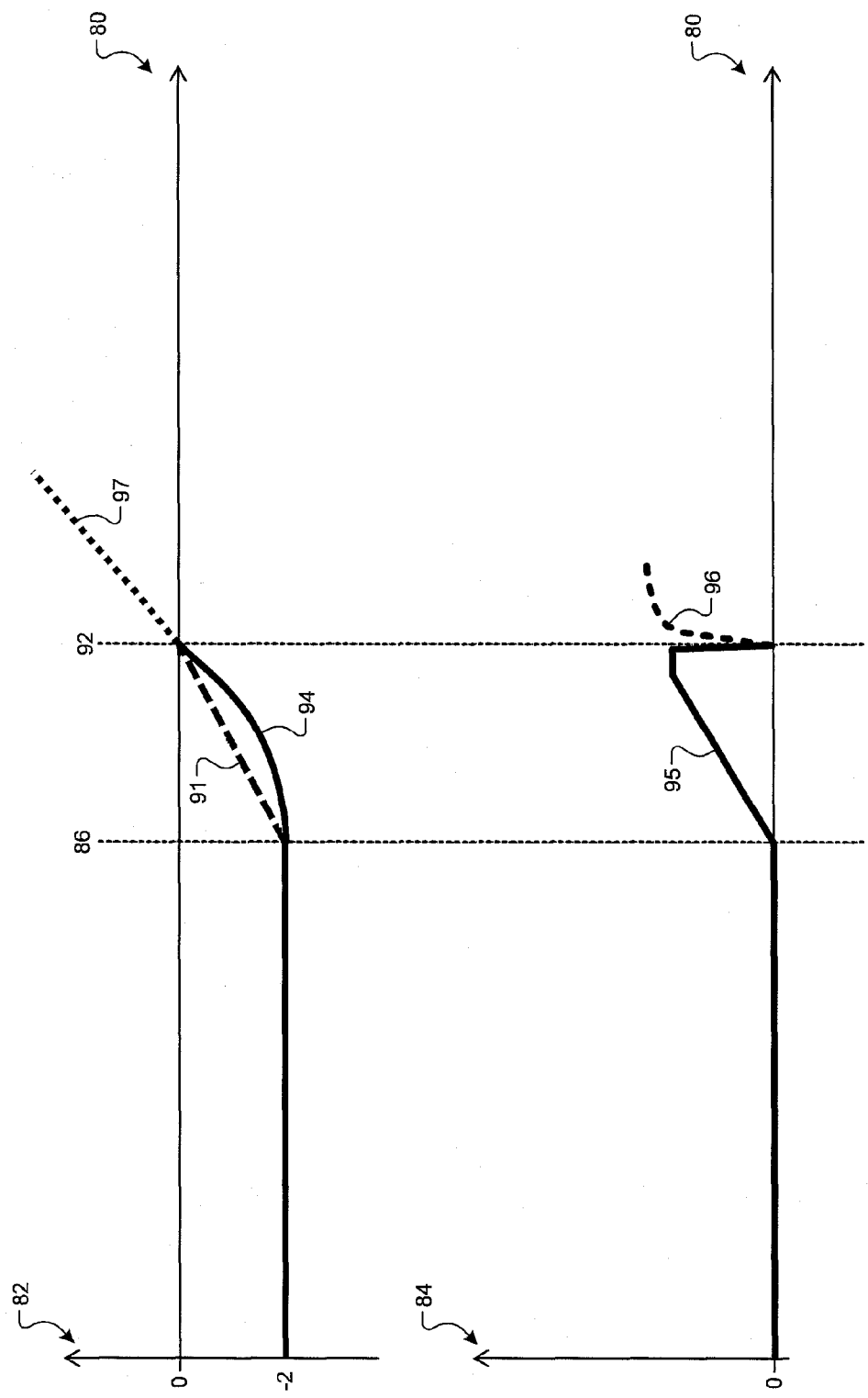
FIG. 4B is a graph illustrating a simulated unpowered to powered transition for a vehicle having a dry DCT according to another implementation of the present disclosure.

Referring now to FIGS. 4A and 4B, simulated applications of the brakes 48 according to (i) the cubic velocity path and (ii) the half-parabolic velocity path, respectively, are shown. A horizontal axis 80 represents time and vertical axes 82 and 84 represent vehicle speed (e.g., in mph) and vehicle acceleration (i.e., brake torque profile), respectively. As shown, the vehicle 10 initially is traveling backwards down an inclined grade at a speed of approximately 2 mph. After detecting the launch condition at point 86, the vehicle stop module 74 applies the brakes 48.

FIG. 4A illustrates application of the brakes 48 according to the cubic velocity path 88. More specifically, the cubic velocity path 88 includes parabolic application of brake torque 89 by the brakes 48. Parabolic application of brake torque by the brakes 48 slows the vehicle 10 to the predetermined speed (e.g., zero mph, indicated by reference 90) smoother than a linear velocity path 91. Stopping the vehicle 10 more smoothly provides for improved driver comfort (e.g., reduced noise/vibration/harshness, or NVH). The vehicle 10 is then launched by fully engaging the on-coming clutch and commanding the throttle 18 to a desired position corresponding to the driver's power request (thereby causing increased vehicle acceleration 92 and increased vehicle speed 93).

FIG. 4B illustrates application of the brakes 48 according to the half-parabolic velocity path 94. More specifically, the half-parabolic velocity path 94 includes linear application of brake torque 95 by the brakes 48. Linear application of brake torque by the brakes 48 slows the vehicle 10 to the predetermined speed (e.g., zero mph, indicated by reference 90) faster than the linear velocity path 91. Stopping the vehicle 10 faster provides for faster vehicle launches. The vehicle 10 is then launched by fully engaging the on-coming clutch and commanding the throttle 18 to a desired position corresponding to the driver's power request (thereby causing increased vehicle acceleration 96 and increased vehicle speed 97).

Referring again to FIG. 3, the vehicle stop module 74 may then generate a signal notifying the vehicle launch module 78 that the vehicle 10 is stopped and the on-coming clutch has been commanded to the predetermined position. The vehicle launch module 78 may receive the signal from the vehicle stop module 74 indicating that the vehicle 10 is stopped and the on-coming clutch has been commanded to the predetermined position. When the vehicle 10 is stopped and the on-coming clutch has been commanded to the predetermined position, the vehicle launch module 78 may then launch the vehicle 10. More specifically, the vehicle launch module 78 may (i) fully engage the on-coming clutch to a desired gear and (ii) open the throttle 18 to a desired position corresponding to the driver's power request, thereby propelling the vehicle 10. For example, the vehicle launch module 78 may generate control signals for both the dry DCT 34 (i.e., the on-coming clutch, such as clutch 60) and the throttle 18.

Figure 5:
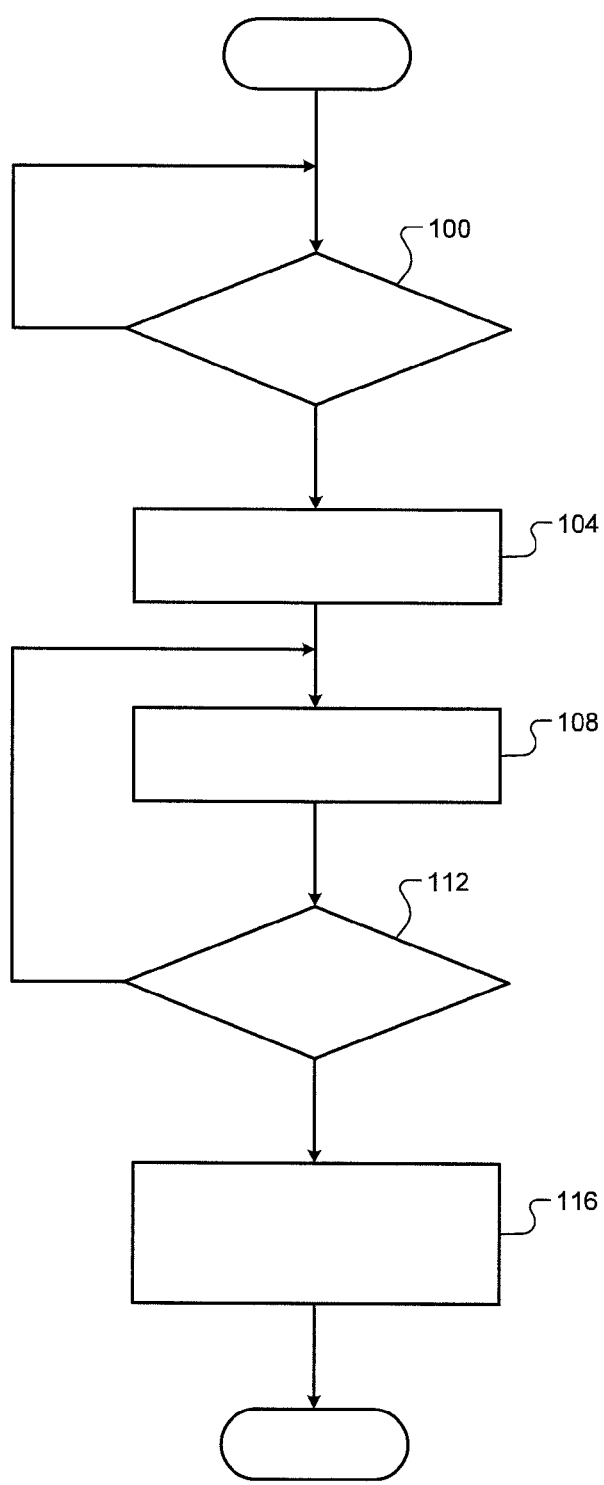
FIG. 5 is a flow diagram illustrating an example method for controlling unpowered to powered transitions in vehicles having dry DCTs.

Referring now to FIG. 5, an example method for controlling unpowered to powered transitions in vehicles having dry DCTs begins at 100. At 100, the control module 50 detects the vehicle launch condition. Specifically, the control module 50 may detect whether (i) the vehicle 10 is on an uphill (i.e., inclined) grade and (ii) the driver of the vehicle has requested power via an accelerator. When the vehicle launch condition is detected, control may proceed to 104. Otherwise, control may return to 100.

At 104, the control module 50 may command the on-coming clutch to the predetermined position. At 108, the control module 50 may apply the brakes 48. For example, the control module 50 may apply the brakes 48 to generate brake torque thereby slowing the vehicle 10 according to either (i) the cubic velocity path (parabolic application of brake torque) or (ii) the half-parabolic velocity path (linear application of brake torque). At 112, the control module 50 may determine whether the predetermined speed has been reached. If true, control may proceed to 116. If false, control may return to 108. At 116, the control module 50 may fully engage the on-coming clutch and open the throttle 18 to a desired position corresponding to the driver's power request.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle having a dry dual clutch transmission (DCT), the control system comprising:
 a launch condition detection module that detects a launch condition based on whether (i) the vehicle is on an uphill grade and (ii) a driver of the vehicle has requested power via an accelerator;
 a vehicle stop module that stops the vehicle when the launch condition is detected by (i) commanding an on-coming clutch of the dry DCT to a predetermined position and (ii) applying brakes of the vehicle; and
 a vehicle launch module that launches the vehicle after the vehicle is stopped by (i) fully engaging the on-coming clutch of the dry DCT and (ii) opening a throttle to a desired position corresponding to the power request.

2. The control system of claim 1, wherein the vehicle stop module applies the brakes of the vehicle according to a cubic velocity path.

3. The control system of claim 2, wherein applying the brakes of the vehicle according to the cubic velocity path includes a parabolic application of brake torque.

4. The control system of claim 1, wherein the vehicle stop module applies the brakes of the vehicle according to a half-parabolic velocity path.

5. The control system of claim 4, wherein applying the brakes of the vehicle according to the half-parabolic velocity path includes a linear application of brake torque.

6. The control system of claim 1, wherein the predetermined position of the on-coming clutch is a kiss point, and wherein the vehicle stop module commands the on-coming clutch of the dry DCT from a pre-kiss point to the kiss point.

7. The control system of claim 1, wherein the launch condition detection module detects the launch condition further based on whether the brakes of the vehicle are fully applied.

8. The control system of claim 7, wherein the launch condition detection module detects the launch condition when the brakes of the vehicle are not fully applied.

9. The control system of claim 1, wherein the vehicle stop module stops the vehicle by slowing the vehicle to a predetermined speed.

10. The control system of claim 9, wherein the predetermined speed is zero miles per hour.

11. A method for controlling a vehicle having a dry dual clutch transmission (DCT), the method comprising:
 detecting a launch condition based on whether (i) the vehicle is on an uphill grade and (ii) a driver of the vehicle has requested power via an accelerator;
 stopping the vehicle when the launch condition is detected by (i) commanding an on-coming clutch of the dry DCT to a predetermined position and (ii) applying brakes of the vehicle; and
 launching the vehicle after the vehicle is stopped by (i) fully engaging the on-coming clutch of the dry DCT and (ii) opening a throttle to a desired position corresponding to the power request.

12. The method of claim 11, further comprising applying the brakes of the vehicle according to a cubic velocity path.

13. The method of claim 12, wherein applying the brakes of the vehicle according to the cubic velocity path includes a parabolic application of brake torque.

14. The method of claim 11, further comprising applying the brakes of the vehicle according to a half-parabolic velocity path.

15. The method of claim 14, wherein applying the brakes of the vehicle according to the half-parabolic velocity path includes a linear application of brake torque.

16. The method of claim 11, wherein the predetermined position of the on-coming clutch is a kiss point, and further comprising commanding the on-coming clutch of the dry DCT from a pre-kiss point to the kiss point.

17. The method of claim 11, further comprising detecting the launch condition further based on whether the brakes of the vehicle are fully applied.

18. The method of claim 17, further comprising detecting the launch condition when the brakes of the vehicle are not fully applied.

19. The method of claim 11, further comprising stopping the vehicle by slowing the vehicle to a predetermined speed.

20. The method of claim 19, wherein the predetermined speed is zero miles per hour.

* * * * *